US006717155B1

(12) United States Patent
Zschornack et al.

(10) Patent No.: US 6,717,155 B1
(45) Date of Patent: Apr. 6, 2004

(54) ELECTRON IMPACT ION SOURCE

(75) Inventors: Guenter Zschornack, Dresden (DE); Vladimir Petrovich Ovsyannikov, Dresden (DE); Frank Grossmann, Ottendorf-Okrilla (DE); Oleg Konstantinovich Koulthachev, Fryazino (RU)

(73) Assignee: Technische Universitaet Dresden, Dresden (DE)

( * ) Notice: Subject to any disclaimer, the term of this patent is extended or adjusted under 35 U.S.C. 154(b) by 13 days.

(21) Appl. No.: 10/110,261

(22) PCT Filed: Oct. 6, 2000

(86) PCT No.: PCT/DE00/03525

§ 371 (c)(1),
(2), (4) Date: Jun. 5, 2002

(87) PCT Pub. No.: WO01/27964

PCT Pub. Date: Apr. 19, 2001

(30) Foreign Application Priority Data

Oct. 8, 1999 (DE) ........................................ 199 49 978

(51) Int. Cl.[7] ................................................ G01K 1/08
(52) U.S. Cl. .......................... 250/396 R; 250/396 ML; 250/423 R; 250/464
(58) Field of Search ............................ 250/423 R, 424, 250/396 R, 427; 315/111.31, 344; 118/723 DER

(56) References Cited

U.S. PATENT DOCUMENTS 2,507,652 A * 5/1950 Smith ......................... 250/427
3,619,684 A * 11/1971 Andrew et al. ......... 315/111.31
4,105,916 A * 8/1978 Siegel ........................ 250/282
4,247,804 A * 1/1981 Harvey ....................... 315/344
4,579,144 A * 4/1986 Lin et al. ....................... 417/1
4,707,637 A * 11/1987 Harvey .................. 315/111.81
5,521,379 A * 5/1996 Franzen et al. ............. 250/282
5,528,034 A * 6/1996 Yamazaki et al. .......... 250/309
5,561,292 A * 10/1996 Buckley et al. ............. 250/288
5,820,680 A * 10/1998 Miyamoto et al. .... 118/723 EB
6,115,452 A * 9/2000 Marrs ......................... 378/119
6,288,394 B1 * 9/2001 Barnes et al. ............... 250/309
6,291,820 B1 * 9/2001 Hamza et al. .............. 250/282
2002/0007796 * 1/2002 Gorokhovsky ........ 118/723 ER

* cited by examiner

*Primary Examiner*—John R. Lee
*Assistant Examiner*—Kalimah Fernandez
(74) *Attorney, Agent, or Firm*—Jordan and Hamburg LLP

(57) ABSTRACT

The invention provides an electron impact ion source for the generation of multiply- or super-highly-chared ions including an electron gun with cathode and anode for the creation and acceleration of electrons, a device for the axial-symmetric focussing of the electron beam, a device for introducing ionisable substances into an ion trap, which may be opened and closed, in the region of the axial-symmetric focussed electron beam, a device for destroying the electrons after they have passed the ion trap, and a device for creating a vacuum around the axial-symmetrically focussed electron beam and the ion trap within said beam. The device for the axial-symmetric focussing of the electron beam comprises at least two ring structures radially magnetized in opposing directions and each of these ring structures enclosed the electron beam. The two ring structures radially magnetized in opposing directions are connected by magnetic conductors to form a unified magnet system, whereby the closing magnetic field passes the ion residence zone in the ion trap. The cathode has a very high emissivity of ≧25 A/cm$^2$ with a small cathode diameter. A vacuum of from $10^{-7}$ to $10^{-11}$ Torr in the ion residence zone can be set while operating the electron impact ion source.

8 Claims, 4 Drawing Sheets

ELECTRON IMPACT ION SOURCE

BACKGROUND

The invention relates to an electron impact ion source that enables the generation of highly-charged ions, the extraction of those ions, serves as a source of UV-, VUV-, IR-rays and of characteristic X-radiation of highly-charged ions.

Arrangements are known of the EBIT (Electron Beam Ion Trap) type to M. A. Levine, R. E. Marrs, J. R. Henderson, D. A. Knapp, M. B. Schneider; Physica Scripta, T22 (1988) 157, in which multiply-charged ions are generated in an axial-symmetric high density electron beam that is accelerated by a system of successive drift tubes under ultra-high vacuum conditions and focussed by superconducting Helmholtz coils.

This arrangement comprises an electron gun, several cylindrical drift tubes, an electron collector, an extractor, a focussing magnet system and a system for the generation of ultra-high vacuum conditions in the arrangement.

The electron beam generates an ion trap in the central part of the arrangement, which holds the ions in radial direction by their space-charge forces. In axial direction the ions, which are created in the electron beam by electron impact ionisation are held by positive potentials at the ends of the drift tube structures according to E. D. Donets; USSR Inventors Certificate No. 248860, Mar. 16, 1967, Bull, OIPOTZ No. 23 (1969) 65.

The obtained highly-charged ions can be extracted from the ion trap by reducing the trap potential at the last drift tube. During the ion storage in the trap characteristic X-rays emitted by the stored ions and other long-wavelength electromagnetic rays are radiated in the meridian plane of the magnet system perpendicular to the source axis.

The maximum achievable ion charge is a function of the ionisation factor $j\tau$, i.e. of the product of the electron current density j and the ion residence time $\tau$ in the electron beam of the trap. Processes that limit the achievable highest charge states are essentially processes of charge exchange of multiply-charged ions with residual gas atoms. Therefore, devices that create highly-charged ions based on the method described must enable the formation of a highly dense electron beam under ultra-high vacuum conditions.

In order to achieve the aims mentioned, in EBIT arrangements cryogenic methods in combination with superconducting methods are employed. Superconducting Helmholtz coils with inductions of the magnetic field of 3T to 5T are used here to focus the electron beam over the length of the ion trap, whilst this length does not extend the value of 25 mm in known arrangements. The current density of the electron beam is 2,000–5,000 A/cm$^2$ over the trap length with a total length of the electron-optical system (cathode—electron collector) of more than 30 cm. The cryogenic system, in addition to cryostatting the superconducting Helmholtz coils at a temperature of 4.2 K, serves as an efficient cryo pump in the region of the ion trap to create a vacuum of from $\geqq 10^{-11}$ to $10^{-12}$ Torr.

The extremely demanding technical parameters of those arrangements result in complex, technically difficult and very expensive arrangements. Additional limitations are put by the demand of cryogenic and ultra-high vacuum equipment.

The reduction of the electron current density to 200 to 500 A/cm$^2$ leads to an increase of the time required to create a specific ion charge state in the trap and, hence, to a decrease of the mean beam intensity of extracted multiply-charged ions, which can be compensated, however, by increasing the total electron current.

For the formation of electron beams having the above-mentioned densities focussing magnet field strengths of from 0.2 T to 0.5 T are required, which can be generated by permanent magnet systems based on modern magnetic materials.

Modern vacuum technology makes it possible to achieve ultra-high vacua in the pressure range of $10^{-12}$ Torr without cryogenic equipment.

This led to the construction of a so-called MICRO-EBIT, as described in H. Khodja, J. P. Briand; Physica Scripta, T71 (1997) 113. The basic idea of this arrangement is that a compact industrial klystron is used for the creation of an ion trap of EBIT type. The focussing magnetic field that limits the radial dimensions of the electron beam in the region of the ion trap is created by two C-shaped permanent magnets, which yield a magnetic induction of 0.25 T. For the generation of the electron beam the original cathode of the klystron with a maximum emissivity of 2.5 A/cm$^2$ is used. The ultra-high vacuum in the arrangement is achieved after heating at 300° C. using standard technology combining a turbomolecular and an ion getter pump.

In the MICRO-EBIT $Ar^{16+}$ ions were detected after an ionisation time of 1.2 s, i.e. an ionisation factor of approx. $1\text{–}10^{20}$ cm$^{-2}$ was obtained, which corresponds to an electron current density of 14 A/cm$^2$.

This arrangement has a low electron current density in the beam (100 times lower than of superconducting EBIT), with which a limitation to comparatively low ion charge states such as $Ar^{16+}$ is connected.

The selection of an unsuitable cathode with a comparatively low emissivity and, connected with it, the utilization of an electron gun with a relatively high electrostatic divergence of the electron beam is another decisive disadvantage.

As it is known from S. I. Molokovski, A. D. Suschkov; Intensive Elektronen- und Ionenstrahlen (Intensive electron and ion beams), Vieweg Verlag, Wiesbaden, 1999, the maximum current intensity in an electron beam focussed by an axial magnetic field can be maintained for Brillouin focussing, provided the magnetic field is zero at the cathode place. In such a system the so-called Brillouin density of the electron flow is limited by thermal velocity components of the electrons when they are exiting from the cathode (see also M. Szilagyi; Electron and Ion Optics, Plenum Press, New York and London , 1988) and by aberrations within the anode lens. A minimum value of the aberrations is possible in the case of paraxial and laminar flows, i.e. for an electron gun with minimum divergence (compression) of the electron beam and hence for a maximum efficient cathode, i.e. a cathode with maximum high emission density.

The objective of the invention is the creation of an effective electron impact ion source (WEBIT) without any cryogenic components and without superconducting equipment to obtain highly-charged ions, the X-ray and VUV-spectroscopy with these ions and the extraction of the highly-charged ions from the trap for different scientific, technological and technical applications.

SUMMARY OF THE INVENTION

According to the invention an arrangement for the axial-symmetric focussing of the electron beam comprises at least two rings radially magnetized in opposing directions and each ring encloses the electron beam, each two rings radially magnetized in opposing directions are connected by magnetic conductors to form a unified magnet system, whereby the closing magnetic field passes the ion residence zone in the ion trap, the cathode has a very high emissivity of ≧25 A/cm$^2$ with a small cathode diameter, and a vacuum of from $10^{-7}$ to $10^{-11}$ Torr in thereon residence zone can be set while operating the source.

Advantageously, magnetized permanent magnet blocks are connected to form rings and are enclosed by magnetic conductors of soft magnetic material so that a radial magnetization results.

Also advantageously, the magnetized permanent magnet blocks are cuboids of hard magnetic materials such as $Sm_5Co$ or NdFeB, so that the rings can be produced efficiently.

Advantageously, the ion trap, which may be opened and closed, consists of a three-part drift tube mounted on a high-voltage insulator. A controllable acceleration potential is applied to the central part and a settable trap potential to the outer parts.

In order to create a maximum vacuum in the ionization zone, the central part of the drift tube is provided with a number of longitudinal slots or other suitable openings along the axial electron beam, which make it possible to pump efficiently in the ion trap region.

In an advantageous embodiment of the electron impact ion source a vacuum recipient with four flanges is provided, in which two opposing flange form a first axis and two other flanges form a second axis, whereby the first and second axes cross each other, electron gun, drift tube, electron collector and extractor, in this order, are arranged at the first axis, and along the second axis a high-voltage bushing to position the drift tube at its place along the first axis can be connected to a flange and a vacuum pump can be connected to the other flange. Other solutions with more or less flanges are possible.

Advantageously, in such an arrangement the magnetic conductors pass the vacuum recipient parallel to the first axis on both sides of the second axis and form there seats for the rings. That portion of the magnetic conductors that reaches into the inside the vacuum recipient is angled L-shaped and magnetically short-circuited to the drift tube.

The electron impact ion source according to the invention enables a minimum value of aberrations for paraxial and laminar flow. To this end, an electron gun with minimum divergence (compression) of the electron beam and hence with maximum efficient cathode, i.e. a cathode with maximum high emission density, is used.

Thus the advantage of the invention is that super-highly charged ions can be efficiently created without cryogenic equipment.

BRIEF DESCRIPTION OF THE FIGURE

In the following, the invention is further explained by examples of embodiment. In the appropriate drawings it is shown by FIG. 1 a schematic representation of the invention;

In FIG. 2 an electron impact ion source according to the invention is shown that comprises a vacuum recipient 1, a magnetically focussing system 2, an electron gun 3, a drift tube structure 4, 15 mounted on a high-voltage insulator, which may be omitted under certain conditions, an electron collector 5 and an extractor 6. In the interior of the vacuum recipient 1 pole shoes 7 of soft magnetic material are arranged to form the field in the ion trap region.

Figure 1:
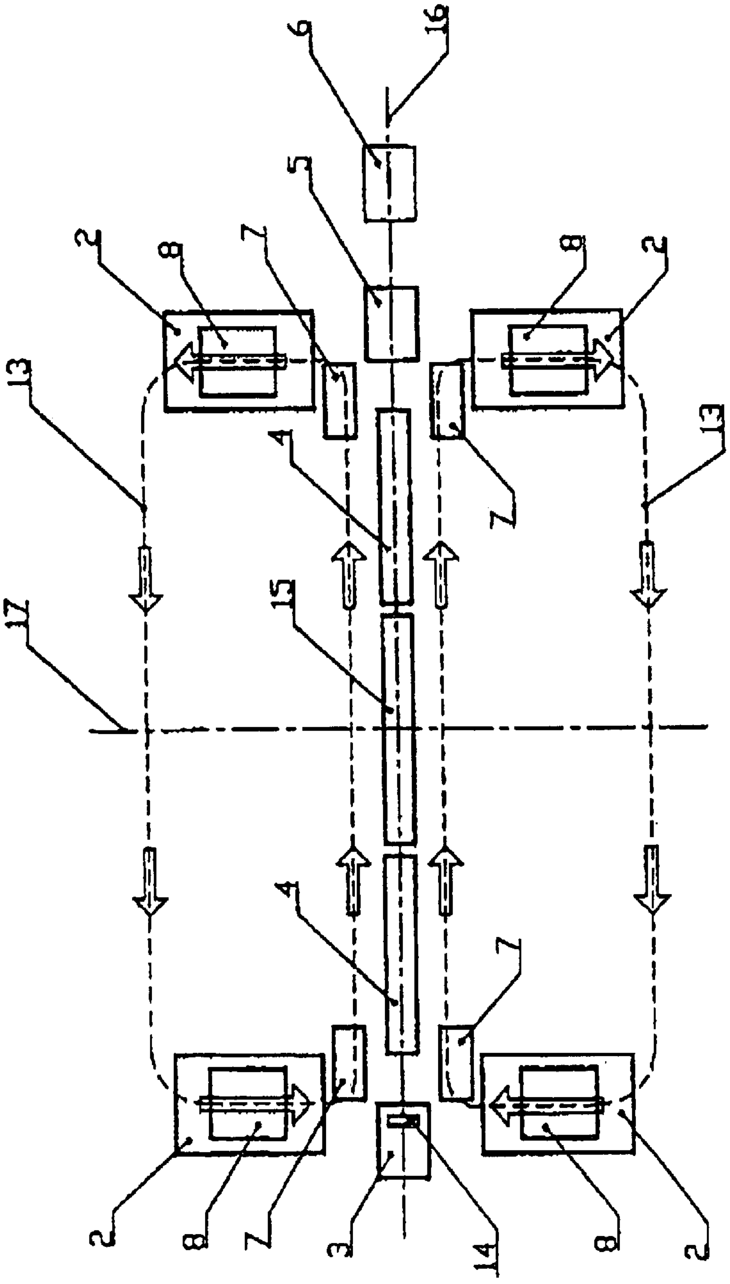
FIG. 1 shows a schematical representation of the invention. On the axis 16 the electron gun 3 with cathode 14, three drift tubes 4, 15, 4, an electron collector 5 and an extractor 6, in this order, are arranged. Two rings 2 radially magnetized in opposing directions enclose the axis 16 at the entrance and exit of the drift tube structure 4, 15 and hence the electron beam that can be created. The rings 2 comprise a number of permanent magnet blocks 8, by which the rings 2 receive a radial magnetization. Between the ends of the drift tube structure 4, 15 and the rings 2 inner pole shoes are provided, by which closed magnetic circuits 13 are generated over the drift tube structure 4, 15.
Figure 2:
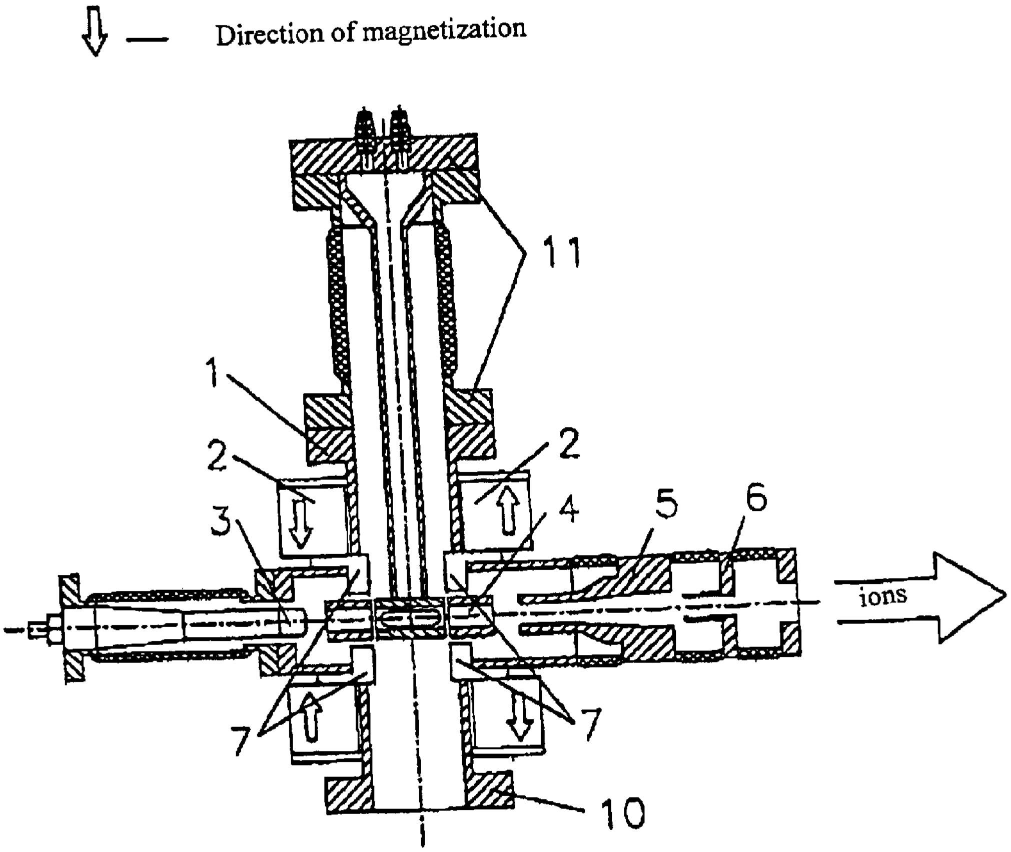
FIG. 2 an advantageous embodiment of the invention in a sectional representation.
Figure 3:
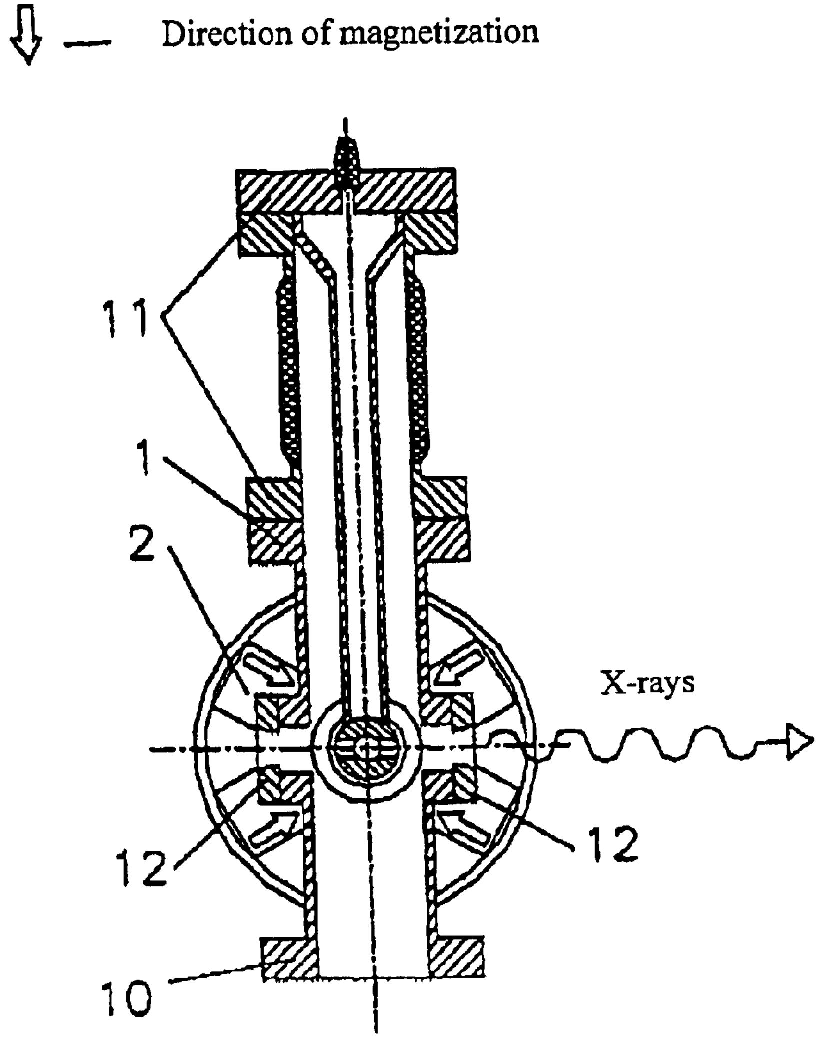
FIG. 3 a section A—A according to the representation of FIG. 2.
Figure 4:
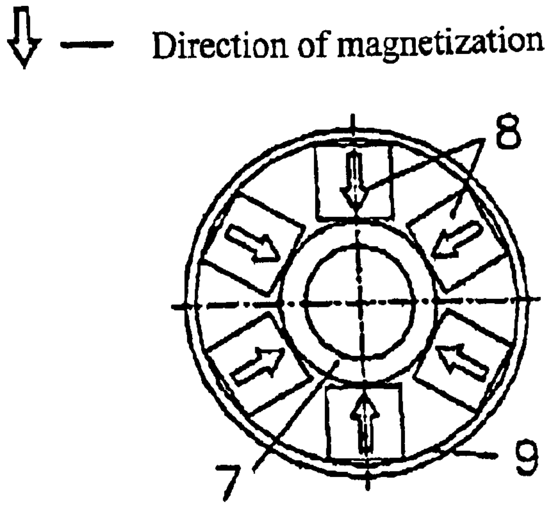
FIG. 4 a detail according to FIG. 3.

The magnetic field is generated by two rings 2 of radially magnetized permanent magnet blocks 8, which are connected to each other by a system of magnetic conductors 7, 9 of soft magnetic material. The single magnetic elements have the shape of simple cuboids, which makes it easily possible to use modern hard magnetic materials such as $Sm_5Co$ or NdFeB.

The rings 2 are outside of the vacuum recipient 1 and therefore can be demounted during a heating time to reach ultra-high vacuum. This peculiarity of the device allows not to consider temperature limits due to the relatively low Curie temperatures of modern hard magnetic materials during the heating process.

Flanges 10 for the coupling of the arrangement to the system for the generation of the required vacuum, the insulated vacuum feed-through 11 to the drift tubes 4, 15 and spectroscopic window 12 for spectroscopic analyses of the characteristic X-radiation or of VUV-radiation, respectively, developing in the ion-loaded electron beam, are in the meridian plane of the device. Therefore minimum distances between the place of creation of the characteristic X-radiation or of the VUV-radiation, respectively, and possible detectors, and to the required vacuum pumps can be chosen. This results in a maximum big space angle (and hence maximum detection effectivity) during the registration of the characteristic X-radiation or of the VUV-radiation, respectively, and a maximum high pumping velocity during the vacuum generation.

The electron gun 3 distinguishes by their geometric dimensions, here, in particular, the cathode diameter, which is selected aiming at reducing the angular divergence of the electron beam and obtaining a paraxial current. This is achieved by use of high-effectively emitting cathode materials, such as monocrystalline boron-lanthanum cathodes.

Compared to known EBIT and EBIS arrangements the following parameters are, at least, obtained:

an electron current density of 200 A/cm$^2$, an electron current of 50 mA, and an electron energy of 30 keV.

The compression stage of the electron beam in the electron gun 3 is 4 (i.e. the ratio of the cathode radius to the radius of the electron beam in the cross-over equals 2). The given values were obtained for a value of the Brillouin field of 250 mT and for a cathode emissivity of 25 A/cm$^2$.

The following table shows the ions obtained with the electron impact ion source according to the invention:

TABLE 1

| Element | Atomic number | Maximum charge state* |
|---|---|---|
| Argon | 18 | 17 |
| Krypton | 36 | 34 |
| Xenon | 54 | 44 |
| Cerium | 58 | 48 |
| Iridium | 77 | 67 |
| Mercury | 80 | 70 |

*Detected by X-ray spectroscopy with an electron energy of 15 keV

What is claimed is:

1. An electron impact ion source for the generation of multiply- or superhighly-charged ions, comprising:

an electron gun with cathode and anode for the creation and acceleration of electrons, a device for the axial-symmetric focusing of the electron beam, means for introducing ionizable substances into an ion trap, which may be opened and closed, in the region of the axial-symmetric focussed focused electron beam, a device for destroying the electrons after they have passed the ion trap, and a device for creating a vacuum around the axial-symmetrically focused electron beam and the ion trap within said beam, the device for the axial-symmetric focusing of the electron beam comprises at least two ring structures radially magnetized in opposing directions and each of these ring structures enclosed the electron beam, each two ring structures radially magnetized in opposing directions being connected by magnetic conductors to form a unified magnet system, whereby the closing magnetic field passes the ion residence zone in the ion trap, the cathode having a very high emissivity of $\geqq 25$ A/cm$^2$ with a small cathode diameter, and a vacuum device applying a vacuum of from $10^{-7}$ to $10^{-11}$ Torr in the ion residence zone while the electron impact ion source operates.

2. The electron impact ion source according to claim 1 wherein magnetized permanent magnet blocks form the radially magnetized rings and are connected by the magnetic conductors of soft magnetic material to form a magnetic circuit.

3. The electron impact ion source according to claim 1 wherein the magnetized permanent magnet blocks are cuboids of hard magnetic materials such as $Sm_5Co$ or NdFeB.

4. The electron impact ion source according to any one of the claims 1 or 2 wherein the radially magnetized rings are detachably arranged outside of the device for creating a vacuum.

5. The electron impact ion source according to any one of claims 1 or 2 wherein the ion trap, which may be opened and closed, includes a three-part drift tube, it being possible to apply a controllable acceleration potential to the middle part and an adjustable trap potential at the two outer potentials.

6. The electron impact ion source of claim 5, wherein the central drift tube is provided with a number of elongated holes, which extend along the axial electron beam.

7. The electron impact ion source of one of the claims 1 or 2, wherein a vacuum container is provided with four flanges, of which two opposite flanges form a first axis and two further flanges form a second axis, the first and second axes crossing one another, the electron gun, drift tubes, electronic collector and extractor being disposed in this order on the first axis, and it being possible to connect a high-voltage feedthrough at a flange along the second axis for positioning the drift tubes in the course of the first axis and a vacuum pump to the other flange.

8. The electron impact ion source of claim 7, wherein the magnetic conductors pierce the vacuum receiver on either side of the second axis and form a seat for the ring structures, and the part of the magnetic conductors, protruding into the vacuum receiver, is angled L-shaped and short-circuited magnetically with the drift tubes.

* * * * *